(12) United States Patent
Brown et al.

(10) Patent No.: US 9,134,399 B2
(45) Date of Patent: Sep. 15, 2015

(54) ATTRIBUTE-BASED PERSON TRACKING ACROSS MULTIPLE CAMERAS

(75) Inventors: Lisa M. Brown, Pleasantville, NY (US); Rogerio S. Feris, White Plains, NY (US); Arun Hampapur, Norwalk, CT (US); Daniel A. Vaquero, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/845,119

(22) Filed: Jul. 28, 2010

(65) Prior Publication Data

US 2012/0026335 A1    Feb. 2, 2012

(51) Int. Cl.
 *H04N 7/18* (2006.01)
 *G01S 5/16* (2006.01)
 *G06K 9/00* (2006.01)
 *G06T 7/20* (2006.01)

(52) U.S. Cl.
 CPC .............. *G01S 5/16* (2013.01); *G06K 9/00295* (2013.01); *G06T 7/2093* (2013.01); *G06T 2207/20016* (2013.01); *G06T 2207/20081* (2013.01); *G06T 2207/30196* (2013.01); *G06T 2207/30232* (2013.01)

(58) Field of Classification Search
 CPC ........................................................ H04N 7/18
 USPC ............................................ 348/159, 208.14
 See application file for complete search history.

(56) References Cited

U.S. PATENT DOCUMENTS

| | | | |
|---|---|---|---|
| 5,870,138 A * | 2/1999 | Smith et al. | 348/143 |
| 6,549,913 B1 | 4/2003 | Murakawa | |
| 6,608,930 B1 | 8/2003 | Agnihotri et al. | |
| 6,795,567 B1 | 9/2004 | Cham et al. | |
| 6,829,384 B2 * | 12/2004 | Schneiderman et al. | 382/154 |
| 6,885,761 B2 | 4/2005 | Kage | |
| 6,920,236 B2 | 7/2005 | Prokoski | |
| 6,967,674 B1 | 11/2005 | Lausch | |
| 7,006,950 B1 | 2/2006 | Greiffenhagen et al. | |

(Continued)

FOREIGN PATENT DOCUMENTS

| | | |
|---|---|---|
| DE | 19960372 A1 | 6/2001 |
| FR | 2875629 A1 | 3/2006 |

(Continued)

OTHER PUBLICATIONS

Ronfard et al. Learning to Parse Pictures of People, Jan. 1, 2002, pp. 1-15.

(Continued)

*Primary Examiner* — David Lazaro
*Assistant Examiner* — Marie Georges Henry
(74) *Attorney, Agent, or Firm* — Ryan, Mason & Lewis, LLP

(57) ABSTRACT

Techniques for tracking an individual across two or more cameras are provided. The techniques include detecting an image of one or more individuals in each of two or more cameras, tracking each of the one or more individuals in a field of view in each of the two or more cameras, applying a set of one or more attribute detectors to each of the one or more individuals being tracked by the two or more cameras, and using the set of one or more attribute detectors to match an individual tracked in one of the two or more cameras with an individual tracked in one or more other cameras of the two or more cameras.

23 Claims, 3 Drawing Sheets

(56) References Cited

U.S. PATENT DOCUMENTS

| | | | |
|---|---|---|---|
| 7,257,569 | B2 | 8/2007 | Elder et al. |
| 7,274,803 | B1 | 9/2007 | Sharma et al. |
| 7,277,891 | B2 | 10/2007 | Howard et al. |
| 7,355,627 | B2 | 4/2008 | Yamazaki et al. |
| 7,382,894 | B2 | 6/2008 | Ikeda et al. |
| 7,391,900 | B2 | 6/2008 | Kim et al. |
| 7,395,316 | B2 | 7/2008 | Ostertag et al. |
| 7,406,184 | B2 | 7/2008 | Wolff et al. |
| 7,450,735 | B1 | 11/2008 | Shah et al. |
| 7,460,149 | B1 | 12/2008 | Donovan et al. |
| 7,526,102 | B2 | 4/2009 | Ozer |
| 7,822,227 | B2 | 10/2010 | Barnes et al. |
| 7,974,714 | B2 | 7/2011 | Hoffberg |
| 8,004,394 | B2 | 8/2011 | Englander |
| 8,208,694 | B2 | 6/2012 | Jelonek et al. |
| 8,411,908 | B2 | 4/2013 | Ebata et al. |
| 8,421,872 | B2 * | 4/2013 | Neven, Sr. ............... 348/222.1 |
| 8,532,390 | B2 | 9/2013 | Brown et al. |
| 8,588,533 | B2 | 11/2013 | Brown et al. |
| 2003/0120656 | A1 | 6/2003 | Kageyama et al. |
| 2005/0013482 | A1 | 1/2005 | Niesen |
| 2005/0162515 | A1 | 7/2005 | Venetianer et al. |
| 2006/0165386 | A1 | 7/2006 | Garoutte |
| 2006/0184553 | A1 | 8/2006 | Liu et al. |
| 2006/0285723 | A1 | 12/2006 | Morellas et al. |
| 2007/0052858 | A1 | 3/2007 | Zhou et al. |
| 2007/0053513 | A1 | 3/2007 | Hoffberg |
| 2007/0122005 | A1 | 5/2007 | Kage et al. |
| 2007/0126868 | A1 | 6/2007 | Kiyohara et al. |
| 2007/0177819 | A1 | 8/2007 | Ma et al. |
| 2007/0183763 | A1 * | 8/2007 | Barnes et al. ............... 396/55 |
| 2007/0237355 | A1 | 10/2007 | Song et al. |
| 2007/0237357 | A1 | 10/2007 | Low |
| 2007/0294207 | A1 | 12/2007 | Brown et al. |
| 2008/0002892 | A1 | 1/2008 | Jelonek et al. |
| 2008/0080743 | A1 | 4/2008 | Schneiderman et al. |
| 2008/0122597 | A1 * | 5/2008 | Englander ................ 340/433 |
| 2008/0123968 | A1 | 5/2008 | Nevatia et al. |
| 2008/0159352 | A1 | 7/2008 | Adhikari et al. |
| 2008/0201282 | A1 | 8/2008 | Garcia et al. |
| 2008/0211915 | A1 | 9/2008 | McCubbrey |
| 2008/0218603 | A1 | 9/2008 | Oishi |
| 2008/0232651 | A1 | 9/2008 | Woo |
| 2008/0252722 | A1 | 10/2008 | Wang et al. |
| 2008/0252727 | A1 | 10/2008 | Brown et al. |
| 2008/0269958 | A1 | 10/2008 | Filev et al. |
| 2008/0273088 | A1 | 11/2008 | Shu et al. |
| 2008/0317298 | A1 | 12/2008 | Shah et al. |
| 2009/0046153 | A1 | 2/2009 | Chen et al. |
| 2009/0060294 | A1 | 3/2009 | Matsubara et al. |
| 2009/0066790 | A1 | 3/2009 | Hammadou |
| 2009/0074261 | A1 | 3/2009 | Haupt et al. |
| 2009/0097739 | A1 | 4/2009 | Rao et al. |
| 2009/0174526 | A1 | 7/2009 | Howard et al. |
| 2009/0261979 | A1 * | 10/2009 | Breed et al. ............... 340/576 |
| 2009/0295919 | A1 * | 12/2009 | Chen et al. ............... 348/143 |
| 2010/0106707 | A1 | 4/2010 | Brown et al. |
| 2010/0150447 | A1 | 6/2010 | GunasekaranBabu et al. |
| 2011/0087677 | A1 | 4/2011 | Yoshio et al. |
| 2012/0039506 | A1 | 2/2012 | Sturzel et al. |

FOREIGN PATENT DOCUMENTS

| | | |
|---|---|---|
| JP | H0863597 A | 3/1996 |
| JP | H10222678 A | 8/1998 |
| JP | 2004070514 A | 3/2004 |
| JP | 2005078376 A | 3/2005 |
| JP | 2009252118 A | 10/2009 |
| TW | 201006527 A | 2/2010 |
| TW | 201020935 A | 6/2010 |
| TW | M381850 U | 6/2010 |
| WO | WO 2009117607 A1 | 9/2009 |
| WO | 2009133667 A1 | 11/2009 |
| WO | 2010023213 A1 | 3/2010 |

OTHER PUBLICATIONS

Jiang et al. View synthesis from Infrared-visual fused 3D model for face recognition, Fifth Intl. Conference on Information, Communications and Signal Processing, pp. 177-180, 2005.

Gundimada et al. Feature Selection for Improved Face Recognition in Multisensor Images. In R. Hammoud, B. Abidi and M. Abidi, editors. Face Biometrics for Personal Identification, Signals and Communication Technology, pp. 109-120, Springer Berlin Heidelberg, 2007.

Viola et al. Rapid Object Detection using a Boosted Cascade of Simple Features. 2001.

Viola and Jones. Robust Real-Time Object Detection. 2001.

Tseng et al. Mining from time series human movement data. 2006.

Raskar et al. Image Fusion for Context Enhancement and Video Surrealism. 2004.

Abidi et al. Survey and Analysis of Multimodal Sensor Planning and Integration for Wide Area Surveillance. 2008.

Kong et al. Recent advances in visual and infrared face recognition—a review. 2005.

Hampapur et al. Multi-scale Tracking for Smart Video Surveillance. IEEE Transactions on Signal Processing, vol. 22, No. 2, Mar. 2005.

Dalal et al., "Histograms of Oriented Gradients for Human Detection", CVPR 2005, San Diego, USA.

Comaniciu et al., "Real-Time Tracking of Non-Rigid Objects Using Mean Shift", CVPR 2000, Hilton Head, SC, USA.

U.S. Appl. No. 12/845,116, filed Jul. 28, 2010, titled, Facilitating People Search in Video Surveillance.

U.S. Appl. No. 12/845,121, filed Jul. 28, 2010, titled, Multispectral Detection of Personal Attributes for Video Surveillance.

Mittal et al, M2Tracker: A Multi-View Approach to Segmenting and Tracking People in a Cluttered Scene, International Journal of Computer Vision, vol. 51, Issue 3, pp. 189-203, Feb. 2003.

Park et al., Simultaneous Tracking of Multiple Body Parts of Interacting Persons, Computer Vision and Image Understanting, vol. 102, Issue 1, pp. 1-21, 2006.

Chibelushi et al., Facial Expression Recognition: A Brief Tutorial Overview, pp. 1-5, 2002.

Xu et al., Pedestrian Detection with Local Feature Assistant, Control and Automation, 2007, ICCA 2007, IEEE International Conference on May 30-Jun. 1, 2007, pp. 1542-1547, 2007.

Mohan et al., Example-Based Object Detection in Images by Components, IEEE Transaction of Pattern Analysis and Machine Intelligence, vol. 23, No. 4, pp. 349-361, Apr. 2001.

Felzenszwalb et al., Pictorial Structures for Object Recognition, International Journal of Computer Vision (IJCV), pp. 1-42, Jan. 2005.

Ramanan et al., Strike a Pose: Tracking People by Finding Stylized Poses, Computer Vision and Pattern Recognition (CVPR), San Diego, CA, Jun. 2005.

Tran et al., Configuration Estimates Improve Pedestrian Finding, National Information Processing Systems Foundation, 2007.

Tsochantaridis et al., Large Margin Methods for Structured and Interdependent Output Variables, Journal of Machine Learning Research (JMLR), Sep. 2005.

Naive Bayes Classifier, Wikipedia, http://en.wikipedia.org/wiki/Naive_Bayes_classifier, Jul. 27, 2010, 7 pages.

KaewTraKulPong et al., A Real Time Adaptive Visual Surveillance System for Tracking Low-Resolution Colour Targets in Dynamically Changing Scenes, Image and Vision Computing, vol. 21, Issue 1-0, pp. 913-929, 2003.

Schmidt, Automatic Initialization for Body Tracking Human Upper Body Motions, 3rd International Conference on Computer Vision Theory and Applications (VISAPP), Jan. 22, 2008.

Lao et al., Fast Detection and Modeling of Human-Body Parts from Monocular Video, F.J. Perales and R.B. Fisher (Eds.): AMDO 2008, LNCS 5098, pp. 380-389, 2008.

U.S. Appl. No. 12/845,095, filed Jul. 28, 2010, titled, Semantic Parsing of Objects in Video.

Mohan et al., Example-Based Object Detection in Images by Components, IEEE Transactions on Pattern Analysis and Machine Intelligence, vol. 23, No. 4, Apr. 2001, pp. 349-361.

International Search Report for PCT/EP2011/062910 dated Oct. 6, 2011.

(56) References Cited

OTHER PUBLICATIONS

Ronfard et al., Learning to Parse Pictures of People, Lecture Notes in Computer Science—LNCS, vol. 2353, Jan. 1, 2002, pp. 700-714.

Li-Jia Li et al., Towards Total Scene Understanding: Classification, Annotation and Segmentation in an Automatic Framework, Computer Vision and Pattern Recognition, 2009, CVPR 2009. IEEE, Piscataway, NJ, USA, Jun. 20, 2009, pp. 2036-2043.

Szelisky, Computer Vision: Algorithms and Applications, Jan. 1, 2011, Springer, pp. 615-621.

Marr, Vision, Jan. 1, 1982, Freeman, pp. 305-313.

Ramanan, Part-Based Models for Finding People and Estimating Their Pose, in: Thomas B. Moeslund et al., Visual Analysis of Humans, Jan. 1, 2011, Springer, pp. 1-25.

Zhu et al., A Stochastic Grammar of Images, Jan. 1, 2007, Now Publishers, pp. 259-362.

Vaquero et al., Chapter 14: Attribute-Based People Search, in: Yundian Ma et al. Intelligent Video Surveillance: Systems and Technology, Jan. 1, 2009, pp. 387-405.

Feris, Chapter 3, Case Study: IBM Smart Surveillance System, in: Yundian Ma et al., Intelligent Video Surveillance: System and Technology, Jan. 1, 2009, pp. 47-76.

Nowozin et al., Structured Learning and Prediction in Computer Vision, Jan. 1, 2011, Now Publishers, pp. 183-365.

Wu, Integration and Goal-Guided Scheduling of Bottom-up and Top-Down Computing Processes in Hierarchical Models, UCLA Jan. 1, 2011.

Lin L et al., A Stochastic Graph Grammar for Compositional Object Representation and Recognition, Pattern Recognition, Elsevier, GB, vol. 42, No. 7, Jul. 1, 2009, pp. 1297-1307.

Yang et al., Evaluating Information Contributions of Bottom-up and Top-down Processes, Computer Vision, 2009 IEEE, Piscataway, NJ, USA, Sep. 29, 2009, pp. 1042-1049.

Tan et al., Enhanced Pictorial Structures for Precise Eye Localization Under Incontrolled Conditions, Computer Vision and Pattern Recognition, 2009. CVPR 2009. IEEE, Piscataway, NJ, USA Jun. 20, 2009, pp. 1621-1628.

Ioffe et al., Probabilistic Methods for Finding People, International Journal of Computer Vision, Kluwer Academic Publishers, Norwell, US, vol. 43, No. 1, Jun. 1, 2001, pp. 45-68.

Samangooei et al., The Use of Semantic Human Description as a Soft Biometric, Biometrics: Theory, Applications and Systems, 2008. BTAS 2008. 2nd IEEE International Conference.

Park et al., Multiresolution Models for Object Detection, in Proceedings of the 11th European Conference on Computer Vision: Part IV, pp. 241-254 (2010).

Yokokawa et al., Face Detection with the Union of Hardware and Software, Technical Report of IEICE, The Institute of Electronics, Information and Communication Engineers, Jan. 10, 2007.

\* cited by examiner

ATTRIBUTE-BASED PERSON TRACKING ACROSS MULTIPLE CAMERAS

CROSS-REFERENCE TO RELATED APPLICATIONS

The present application is related to U.S. patent application entitled "Multispectral Detection of Personal Attributes for Video Surveillance," identified by Ser. No. 12/845,121 and filed concurrently herewith, the disclosure of which is incorporated by reference herein in its entirety.

Additionally, the present application is related to U.S. patent application entitled "Facilitating People Search in Video Surveillance," identified by Ser. No. 12/845,116, and filed concurrently herewith, the disclosure of which is incorporated by reference herein in its entirety.

Also, the present application is related to U.S. patent application entitled "Semantic Parsing of Objects in Video," identified by Ser. No. 12/845,095, and filed concurrently herewith, the disclosure of which is incorporated by reference herein in its entirety.

FIELD OF THE INVENTION

Embodiments of the invention generally relate to information technology, and, more particularly, to video surveillance.

BACKGROUND OF THE INVENTION

Tracking people across multiple cameras with non-overlapping fields of view poses a challenge. Existing approaches include using face recognition technology or relying on soft-biometrics features such as clothing color or person height to identify and track a person over different camera views. However, face recognition techniques are very sensitive to illumination changes, face pose variations, and low-resolution imagery (typical conditions in surveillance scenes). Also, general features like clothing color are subject to ambiguity (for example, two different people may be wearing clothes with the same color). Additionally, color and appearance of a person can change dramatically from camera to camera, due to lighting changes, different camera sensor responses, etc.

SUMMARY OF THE INVENTION

Principles and embodiments of the invention provide techniques for attribute-based person tracking across multiple cameras. An exemplary method (which may be computer-implemented) for tracking an individual across two or more cameras, according to one aspect of the invention, can include steps of detecting an image of one or more individuals in each of two or more cameras, tracking each of the one or more individuals in a field of view in each of the two or more cameras, applying a set of one or more attribute detectors to each of the one or more individuals being tracked by the two or more cameras, and using the set of one or more attribute detectors to match an individual tracked in one of the two or more cameras with an individual tracked in one or more other cameras of the two or more cameras.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
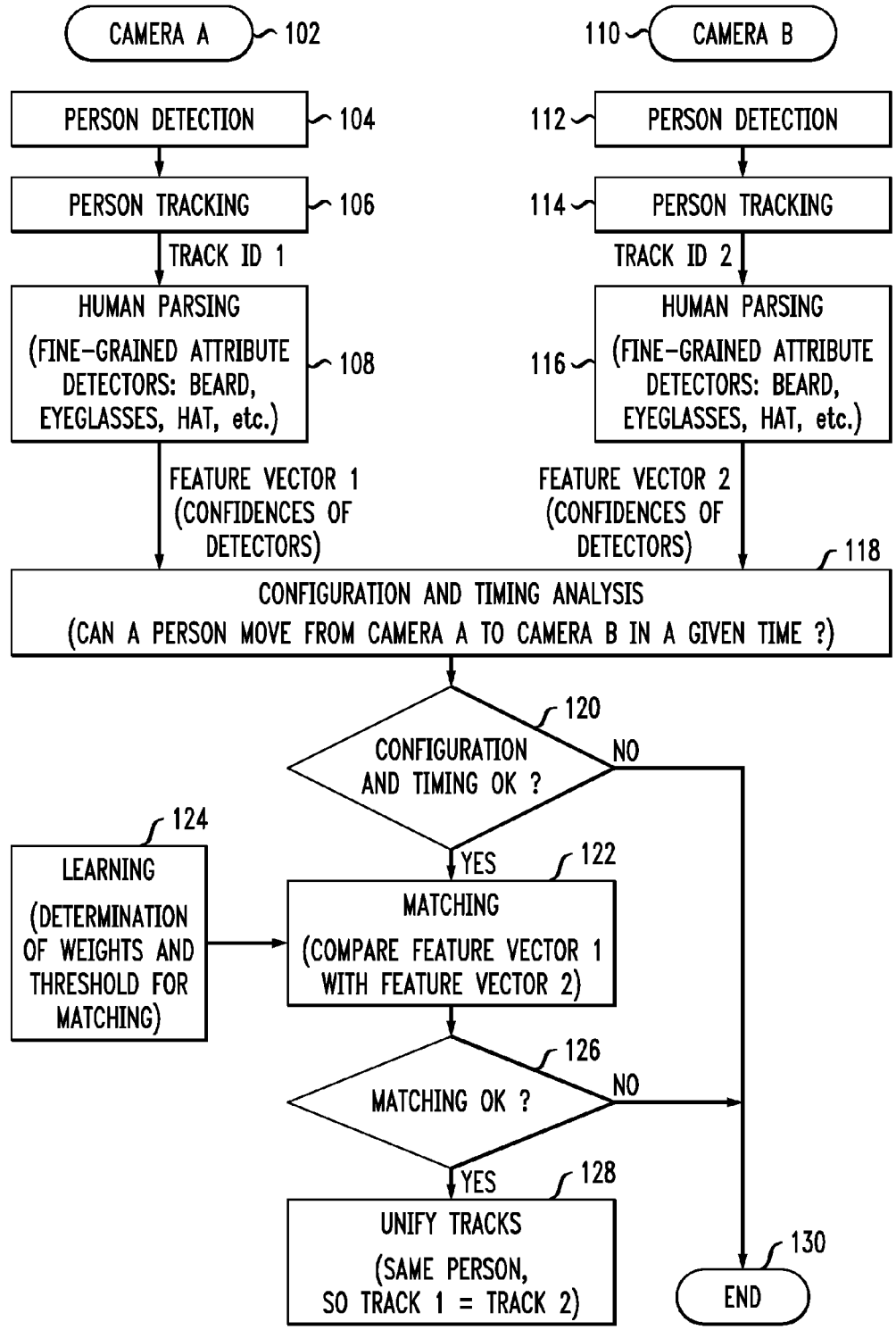
FIG. 1 is a block diagram illustrating an exemplary embodiment, according to an aspect of the invention.

Principles of the invention include attribute-based people tracking across multiple cameras (for example, video cameras). One or more embodiments of the invention can be used, for example, for smart video surveillance to note trajectories for each of multiple people in a three-dimensional (3D) space. This can be useful, by way of example, for tracking individuals across cameras, observing common shopper patterns in retail stores, etc.

As described herein, one or more embodiments of the invention can address the issue of, for example, given a tracked person in camera A, and a person in camera B, determining whether they correspond to the same person (so that the person can be unified into a single video track). As such, one or more embodiments of the invention include tracking people across multiple cameras based on fine-grained body parts and attribute detectors.

As detailed herein, images of people can be matched based on a set of fine-grained attributes such as, for example, the presence of beard, moustache, eyeglasses, sunglasses, hat, absence of hair (bald people), shape of features (long nose, eyes shape, short/long shirt sleeves), color and texture of clothing, etc. These attribute detectors are learned from large amounts of training images, in multiple levels of resolution. Further, one or more embodiments of the invention can also consider non-visual attributes from other sensors such as, for example, odor and temperature to improve the matching process.

By way of example and not limitation, consider a set of surveillance cameras with non-overlapping fields of view. In each camera, people are detected and tracked in the local field of view using standard computer vision algorithms. Now suppose a person moves from a place that is monitored by camera A to another place that is monitored by camera B. One or more embodiments of the invention include assigning a unique "track ID" (track identifier) for the trajectories of the person locally tracked in cameras A and B, so that tracking in a global coordinate system can be performed. In one or more embodiments of the invention, a "track ID" might simply include a number to identify the track, such as, for example, track ID 1, track ID 2, etc.

This implies a need to match a person tracked in one camera with other people tracked in other cameras. In one or more embodiments of the invention, this matching can be performed by taking into account the geometric configuration of the cameras, the time information (that is, the time usually taken by a person to walk from camera A to B), and a set of fine-grained person attributes as described herein.

One or more embodiments of the invention can be implemented in connection with a set of surveillance cameras with non-overlapping fields of view. As described herein, a unique track identifier (ID) can be generated and used for the trajectories of a person locally tracked in cameras. For each person that enters the scene, a "track" is started. The "track" ends when the person leaves the scene (that is, leaves the camera field of view). Each track has a unique track ID to identify the track. Also, by way of example, this can be generated incrementally—track 1, track 2, . . . , track n.

Further, one or more embodiments of the invention use a feature for matching a person tracked in one camera with other people (for example, the same person) tracked on other cameras using a set of fine-grained person attributes. Additionally, as further detailed herein, a technique and/or algorithm for matching people across cameras based on a set of fine-grained parts and attributes detectors is used, wherein the detectors are learned from large amount of training data (for example, using Adaptive Boosting (Adaboost) learning, thus being robust to lighting and viewpoint changes.

In one or more embodiments of the invention, as noted herein, matching people across cameras can also include a matching algorithm using the geometric configuration of the cameras (including time information) and a set of fine-grained person attributes. Also, one or more embodiments of the invention can include using a human parsing process and/or a methodology applying for both tracking and human parsing. Further, a weighted vector distance matrix and a threshold can be used, for example, in conjunction with a comparison method to determine if the person in camera A corresponds to the person in camera B.

By way of example and not limitation, consider again a person moving from camera A to camera B. One or more embodiments of the invention could proceed as follows. The person is tracked in camera A, for example, using standard tracking techniques. In addition, a set of fine-grained Adaboost detectors (including, for example, detectors for beard, glasses, hat, baldness, etc.) is applied to each image of the person. By way of example only, techniques for generating such detectors can be found in U.S. patent application Ser. No. 12/845,119 entitled "Multispectral Detection of Personal Attributes for Video Surveillance," filed concurrently herewith, the disclosure of which is incorporated by reference herein in its entirety. This process can be referred to herein as human parsing.

Using the human parsing process, one or more embodiments of the invention can include obtaining a feature vector $F_a=[a_1, a_2, a_3, \ldots, a_n]$ for the person in camera A, corresponding to the max confidence values of each Adaboost detector. Note that each "track" corresponds to a set of image frames with the location of the person in each frame. For each frame, one or more embodiments of the invention apply the set of attribute detectors (beard, eyeglasses, etc.) and obtain a confidence value for each detector in each frame. As such, each detector will have a set of confidence values (one for each frame of the track). For each detector, one or more embodiments of the invention take the maximum confidence value over the frames (that is, "max confidence value") and store it as one element in the $F_a$ vector. Accordingly, the first element of the $F_a$ vector will contain the max confidence value, for example, for beard, the second element, for example, for eyeglasses, and so on.

By way of example and not limitation, consider that a person has been tracked over five frames. All detectors are applied in each one of these five frames, generating confidence values. For example, the beard detector may generate five confidence values [0.2, 0.5, 0.9, 0.2, 0.7]. The "max confidence value" for the beard attribute is therefore 0.9 (the maximum value of the five confidence numbers).

The same methodology of tracking and human parsing can be applied when the person is moving within the field of view of camera B, resulting in one or more embodiments of the invention obtaining the feature vector $F_b=[b_1, b_3 \ldots, b_n]$.

One or more embodiments of the invention can additionally determine the amount of time taken by the person to leave camera A and appear in camera B (given the geometric arrangement of cameras) to see if it is consistent with an average or customary time calculated previously based on earlier data collected, for example, by camera A and camera B. One or more embodiments of the invention include specifying a range of time periods calculated based on earlier collected data, as well as defining a priori if it is possible for one person to move from one camera to another based on the spatial location of cameras.

If the amount of time is consistent, one or more embodiments of the invention can include computing a weighted vector distance between $F_a$ and $F_b$:

$$\sum_{i=1}^{n} w_i(a_i - b_i)^2$$

and comparing the weighted vector distance to a threshold to see if the person in camera A corresponds to person in camera B. Both the threshold and the set of weights can be obtained from a standard learning process (for example, using artificial neural networks). The learning process can be seen as a black box where training data is provided (including input feature vectors and an output variable (indicating whether it is the same person or not). The output of the black box can include weights and the threshold. If there is a match (that is, the person in camera A corresponds to the person in camera B), then both trajectories are unified so that they correspond to a single track.

Also, as noted herein, in one or more embodiments of the invention, the weights $w_i$ are obtained offline according to the reliability of each detector. As an example, if a "beard detector" is more reliable than a "hat detector" then the beard detector confidence value will be associated with a larger weight.

FIG. 1 is a block diagram illustrating an exemplary embodiment (for any pair of cameras A and B), according to an aspect of the invention. FIG. 1 depicts camera A 102 which captures images, leading to the steps of person detection 104 (via a person detection module), person tracking 106 (via a person tracking module) and human parsing 108 (via use of fine-grained attribute (for example, beard, eyeglasses, hat, etc.) detector modules). This sequence produces feature vector 1 in conjunction with the use of detector confidence values.

As detailed herein, the task of a person detection module includes, given a specific video frame, finding whether there exists such a person as is being sought and, if so, determining his/her size and position in the image. The task of a person tracking module includes, given that a person was detected at frame N, localizing the same person at frame N+1, N+2, etc. until the person leaves the scene. Also, in one or more embodiments of the invention, a feature vector is created by the human parsing process via applying attribute detectors such as, for example, beard, etc. and taking the max confidence values as explained herein.

Additionally, FIG. 1 depicts camera B 110 which captures images, leading to the steps of person detection 112 (via a person detection module), person tracking 114 (via a person tracking module) and human parsing 116 (via use of fine-grained attribute (for example, beard, eyeglasses, hat, etc.) detector modules). This sequence produces feature vector 2 in conjunction with the use of detector confidence values.

FIG. 1 also depicts step 118, which includes use of a configuration and timing analysis module to determine if a person can move from camera A to camera B in a given time. Step 120 includes determining if the configuration and timing of the person being surveilled is consistent with the pre-determined range. In one or more embodiments of the invention, the user estimates the minimum and maximum times that a person could walk from camera A to Camera B. Also, in one or more embodiments of the invention, it is assumed that the person does not stop for a long time and keeps walking or running.

If the configuration and timing of the person being surveilled is not consistent with the pre-determined range, the process ends at step 130. If the configuration and timing of the person being surveilled is consistent with the pre-determined range, step 122 includes comparing feature vector 1 with feature vector 2 via use of a matching module as well as receiving input from a learning module 124 in the form of determinations of weights and thresholds for matching. Step 126 includes determining if the matching of feature vector 1 and feature vector 2 is acceptable. If no, the process ends at step 130. If yes, the tracks are unified at step 128, indicating that the same person is being compared (that is, track 1=track 2). Additionally, in one or more embodiments of the invention, the matching, that is, the distance between the two feature vectors is compared to a user-defined threshold to determine whether the persons are the same or not.

Figure 2:
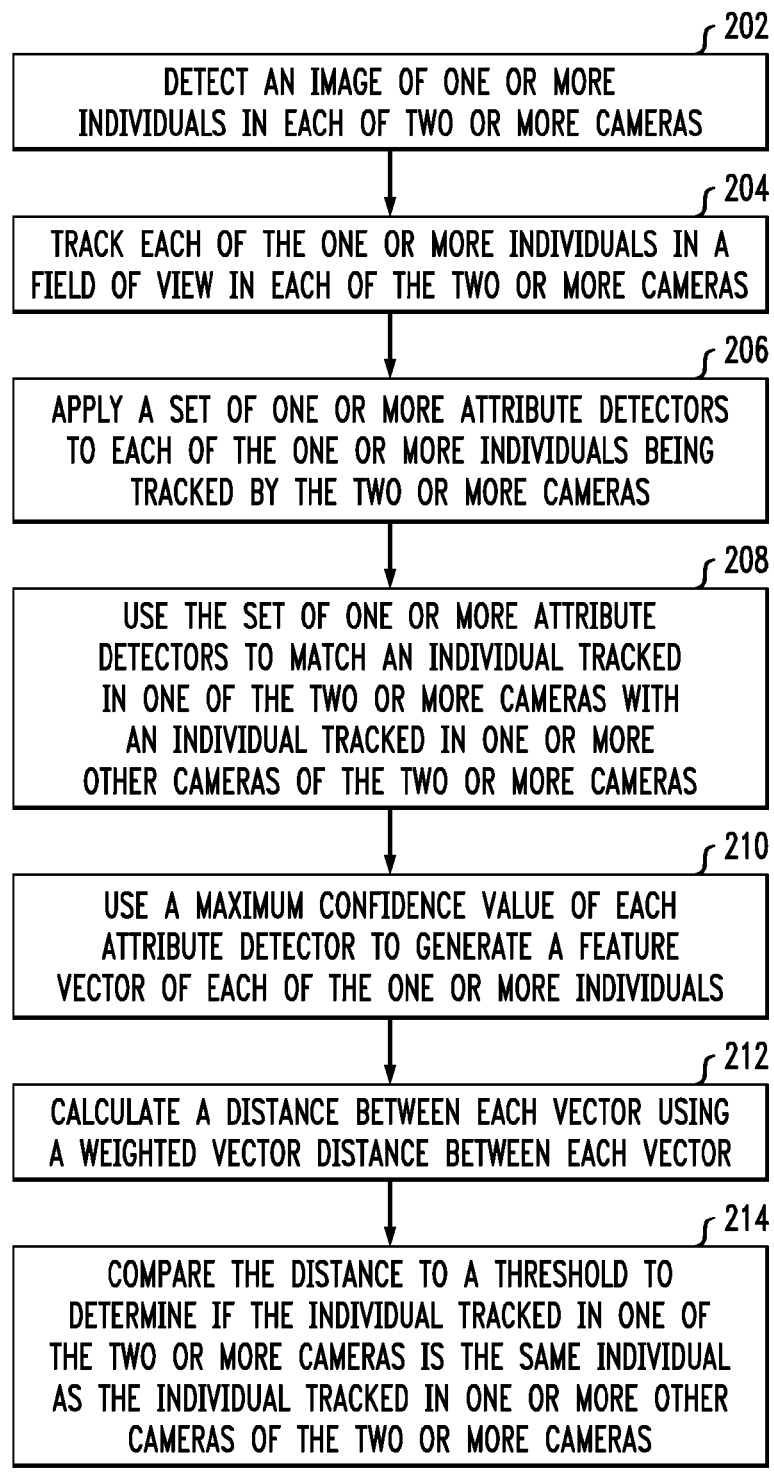
FIG. 2 is a flow diagram illustrating techniques for tracking an individual across two or more cameras, according to an embodiment of the invention.

FIG. 2 is a flow diagram illustrating techniques for tracking an individual across two or more cameras, according to an embodiment of the present invention. Step 202 includes detecting an image of one or more individuals in each of two or more cameras. This step can be carried out, for example, using a person detection module.

Step 204 includes tracking each of the one or more individuals in a (for example, a local) field of view in each of the two or more cameras. This step can be carried out, for example, using a person tracking module. Tracking each of the individuals in a local field of view in each of the two or more cameras can include using one or more computer vision algorithms.

Step 206 includes applying a set of one or more attribute detectors to each of the one or more individuals being tracked by the two or more cameras. This step can be carried out, for example, using a human parsing module. The set of attribute detectors can include, for example, a set of one or more fine-grained Adaptive Boosting attribute detectors. Further, the attribute detectors can include one or more attribute detectors for presence of a beard, presence of a moustache, presence of eyeglasses, presence of sunglasses, presence of a hat, absence of hair, shape of body features, shape of clothing features, clothing color, clothing texture, etc. Also, the attribute detectors can be learned from a set of training images in one or more levels of resolution.

Step 208 includes using the set of one or more attribute detectors to match an individual tracked in one of the two or more cameras with an individual tracked in one or more other cameras of the two or more cameras. This step can be carried out, for example, using a matching module. Using the set of attribute detectors to match an individual tracked in one of the cameras with an individual tracked in one or more other cameras can include, for example, using a geometric configuration of the cameras, time information, and/or a set of individual attributes.

Using the set of one or more attribute detectors to match an individual tracked in one of the two or more cameras with an individual tracked in one or more other cameras of the two or more cameras can also include steps 210, 212 and 214. Step 210 includes using a maximum confidence value of each attribute detector to generate a feature vector of each of the one or more individuals. Step 212 includes calculating a distance between each vector using a weighted vector distance between each vector. Also, step 214 includes comparing the distance to a threshold to determine if the individual tracked in one of the two or more cameras is the same individual as the individual tracked in one or more other cameras of the two or more cameras.

In one or more embodiments of the invention, the geometric configuration can be acquired before the system starts. By way of example and not limitation, consider Camera A, and assume that a person can walk from camera A to Camera B, but cannot to walk from camera A to Camera C (for example, because there is a physical wall, etc.). The geometric configuration will contain this information, indicating which cameras are adjacent.

Additionally, with respect to the matching process, consider (for illustrative purposes) the following example. A person shows up in camera A. He of she is detected, tracked, and the attribute detectors are applied. By taking the max confidence values of each detector, a feature vector Fa is formed. Assume, also, that there are five attributes (for example, beard, bald, eyeglasses, hat, and striped shirt). Accordingly, the feature vector Fa is 5-dimensional, for example, Fa=[0.4, 0.9, 0.0, 0.9, 0.2]. Subsequently, another person shows up in camera B. The same process is done and a second feature vector is obtained, for example, Fb=[0.2, 1.0, 0.0, 0.1, 0.1]. The distance between the two vectors (that is, matching) is calculated, as described herein, using a $$\sum_{i=1}^{n} w_i (a_i - b_i)^2$$

weighted vector distance between $F_a$ and $F_b$: and comparing that to a threshold to determine if the persons are the same or not.

The techniques depicted in FIG. 2 can also include assigning a unique tracking identifier ("track ID") for each trajectory of an individual locally tracked in each of the two or more cameras to facilitate tracking in a global coordinate system. Additionally, one or more embodiments of the invention can include obtaining a feature vector ($F_a = [a_1, a_2, a_3, \ldots, a_n]$) for an individual in one camera, corresponding to one or more max confidence values of each attribute detector, as well as obtaining a feature vector ($F_b = [b_1, b_2, b_3, \ldots, b_n]$) for the individual when the individual moves within the field of view of a second camera. As detailed herein, examples of attributes include beard, bald, etc., and a feature vector is formed by taking the max confidence values of the attribute detectors.

Also, one or more embodiments of the invention include determining an amount of time taken by the individual to leave a view of the first camera and appear within a view of the second camera to determine if the amount of time is consistent with an established range of time. Further, one or more embodiments of the invention can include computing, if the amount of time is consistent with the established range time, a weighted vector distance between the first camera and the second camera $$\left(\sum_{i=1}^{n} w_i (a_i - b_i)^2\right)$$

and comparing the weighted vector distance to a threshold to determine if the individual in the view of the first camera corresponds to the individual in the view of the second camera.

A trajectory of the first camera and the second camera can be unified to correspond to a single track if the individual in the view of the first camera corresponds to the individual in the view of the second camera. In one or more embodiments of the invention, a trajectory refers to the path take by a person. When tracking the person in one camera, it can be determined, for example, that the person is moving right or left. Accordingly, his/her path is known within the field of view of a camera. In another camera, the person may follow another trajectory. When it is determined that the same person is present in different cameras views, the trajectories are linked. A single track, as used herein, refers to a single trajectory, rather than two different trajectories. One or more embodiments of the invention utilize this information to discover, for example, the path that a person-of-interest took, where he/she went, etc. Additionally, one or more weights used in the weighted vector can be obtained according to the reliability of each attribute detector. The reliability of each attribute detector can be determined using an artificial neural network (as well as, for example, other standard machine learning techniques).

The techniques depicted in FIG. 2 can also include using one or more non-visual attributes from one or more sensors. Non-visual attributes can include, by way of example and not limitation, odor, temperature, etc. In one or more embodiments of the invention, the use of non-visual attribute detectors can include generating confidence values, just as with the visual attribute detectors.

The techniques depicted in FIG. 2 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a person detection module, a person tracking module, a human parsing module, a matching module, a configuration and timing analysis module, and a learning module that can run, for example on one or more hardware processors.

The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
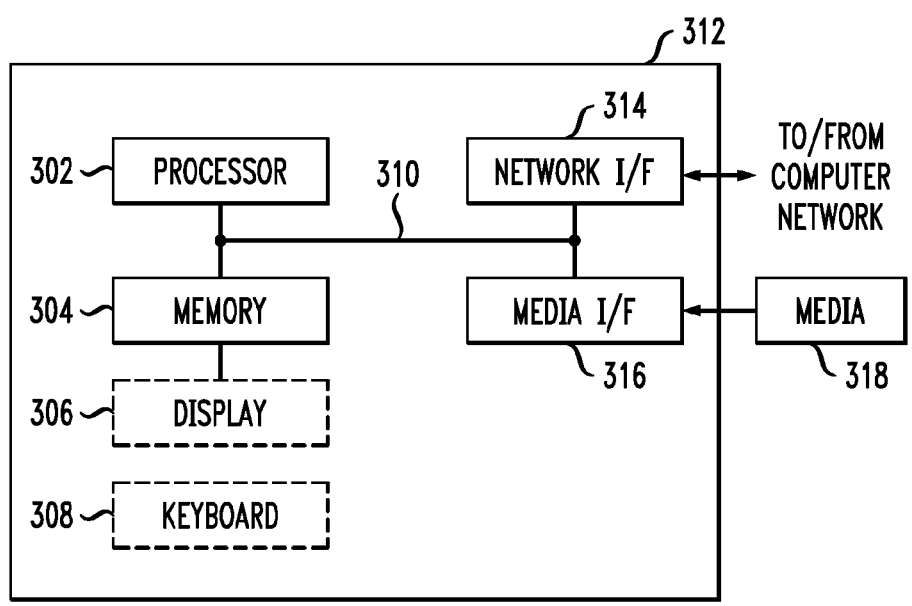
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, tracking people, in video surveillance, across multiple cameras based on fine-grained body parts and attribute detectors.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for tracking an individual across two or more cameras, wherein the method comprises:
    detecting an image of one or more individuals in each of two or more cameras;
    tracking each of the one or more individuals in a field of view in each of the two or more cameras;
    applying a set of multiple attribute detectors to the images of each of the one or more individuals being tracked by the two or more cameras, wherein said attribute detectors (i) provide a probability that given attributes are present in an image and (ii) are learned from training images in multiple levels of resolution to produce robustness to multiple changes in lighting and viewpoint; and
    using the set of multiple attribute detectors to match an individual tracked in one of the two or more cameras with an individual tracked in one or more other cameras of the two or more cameras, wherein using the set of multiple attribute detectors to match an individual tracked in one of the two or more cameras with an individual tracked in one or more other cameras of the two or more cameras comprises:
    using a maximum confidence value of each of the multiple attribute detectors to generate a feature vector of each of the one or more individuals;
    determining a weight associated with each of the multiple attribute detectors, wherein said weight corresponds to a reliability measure of the corresponding attribute detector relative to the remaining attribute detectors in the set of multiple attribute detectors;
    calculating a distance between each vector using a weighted vector distance between each vector based on the determined weight associated with each of the multiple attribute detectors; and
    comparing the distance to a threshold to determine if the individual tracked in one of the two or more cameras is the same individual as the individual tracked in one or more other cameras of the two or more cameras.

2. The method of claim 1, further comprising assigning a unique tracking identifier for each trajectory of an individual locally tracked in each of the two or more cameras to facilitate tracking in a global coordinate system.

3. The method of claim 1, further comprising obtaining a feature vector for the individual when the individual moves within the field of view of a second camera.

4. The method of claim 3, further comprising determining an amount of time taken by the individual to leave a view of the first camera and appear within a view of the second camera to determine if the amount of time is consistent with an established range of time.

5. The method of claim 4, further comprising computing, if the amount of time is consistent with the established range time, a weighted vector distance between the first camera and the second camera and comparing the weighted vector distance to a threshold to determine if the individual in the view of the first camera corresponds to the individual in the view of the second camera.

6. The method of claim 5, further comprising unifying a trajectory of the first camera and the second camera to correspond to a single track if the individual in the view of the first camera corresponds to the individual in the view of the second camera.

7. The method of claim 1, wherein the reliability of each of the multiple attribute detectors is determined using an artificial neural network.

8. The method of claim 1, wherein the set of multiple attribute detectors comprises a set of multiple fine-grained Adaptive Boosting attribute detectors.

9. The method of claim 1, wherein the set of multiple attribute detectors comprises one or more attribute detectors for at least one of presence of a beard, presence of a moustache, presence of eyeglasses, presence of sunglasses, presence of a hat, absence of hair, shape of body features, shape of clothing features, clothing color and clothing texture.

10. The method of claim 1, wherein tracking each of the one or more individuals in a local field of view in each of the two or more cameras comprises using one or more computer vision algorithms.

11. The method of claim 1, wherein the multiple attribute detectors are learned from a set of one or more training images in one or more levels of resolution.

12. The method of claim 1, wherein using the set of multiple attribute detectors to match an individual tracked in one of the two or more cameras with an individual tracked in one or more other cameras of the two or more cameras comprises using at least one of a geometric configuration of the two or more cameras, time information, and a set of individual attributes.

13. The method of claim 1, further comprising using one or more non-visual attributes from one or more sensors.

14. The method of claim 13, wherein the one or more non-visual attributes comprises at least one of odor and temperature.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise a person detection module, a person tracking module, a human parsing module and a matching module executing on a hardware processor.

16. A computer program product comprising a tangible computer readable recordable storage device including computer useable program code for tracking an individual across two or more cameras, the computer program product including:
computer useable program code for detecting an image of one or more individuals in each of two or more cameras;
computer useable program code for tracking each of the one or more individuals in a field of view in each of the two or more cameras;
computer useable program code for applying a set of multiple attribute detectors to the images of each of the one or more individuals being tracked by the two or more cameras, wherein said attribute detectors (i) provide a probability that given attributes are present in an image and (ii) are learned from training images in multiple levels of resolution to produce robustness to multiple changes in lighting and viewpoint; and
computer useable program code for using the set of multiple attribute detectors to match an individual tracked in one of the two or more cameras with an individual tracked in one or more other cameras of the two or more cameras, wherein the computer useable program code for using the set of multiple attribute detectors to match an individual tracked in one of the two or more cameras with an individual tracked in one or more other cameras of the two or more cameras comprises:
computer useable program code for using a maximum confidence value of each of the multiple attribute detectors to generate a feature vector of each of the one or more individuals;
computer useable program code for determining a weight associated with each of the multiple attribute detectors, wherein said weight corresponds to a reliability measure of the corresponding attribute detector relative to the remaining attribute detectors in the set of multiple attribute detectors;
computer useable program code for calculating a distance between each vector using a weighted vector distance between each vector based on the determined weight associated with each of the multiple attribute detectors; and
computer useable program code for comparing the distance to a threshold to determine if the individual tracked in one of the two or more cameras is the same individual as the individual tracked in one or more other cameras of the two or more cameras.

17. The computer program product of claim 16, further comprising computer useable program code for assigning a unique tracking identifier for each trajectory of an individual locally tracked in each of the two or more cameras to facilitate tracking in a global coordinate system.

18. The computer program product of claim 16, further comprising computer useable program code for wherein the computer useable program code for using the set of multiple attribute detectors to match an individual tracked in one of the two or more cameras with an individual tracked in one or more other cameras of the two or more cameras comprises computer useable program code for using at least one of a geometric configuration of the two or more cameras, time information, and a set of individual attributes.

19. The computer program product of claim 16, further comprising:
computer useable program code for obtaining a feature vector for the individual when the individual moves within the field of view of a second camera; and
computer useable program code for determining an amount of time taken by the individual to leave a view of the first camera and appear within a view of the second camera to determine if the amount of time is consistent with an established range of time.

20. A system for tracking an individual across two or more cameras, comprising:
a memory; and
at least one processor coupled to the memory and operative to:
detect an image of one or more individuals in each of two or more cameras;
track each of the one or more individuals in a field of view in each of the two or more cameras;
apply a set of multiple attribute detectors to the images of each of the one or more individuals being tracked by the two or more cameras, wherein said attribute detectors (i) provide a probability that given attributes are present in an image and (ii) are learned from training images in multiple levels of resolution to produce robustness to multiple changes in lighting and viewpoint; and
using the set of multiple attribute detectors to match an individual tracked in one of the two or more cameras with an individual tracked in one or more other cameras of the two or more cameras, wherein at least one processor coupled to the memory and operative to using the set of multiple attribute detectors to match an individual tracked in one of the two or more cameras with an individual tracked in one or more other cameras of the two or more cameras is further operative to:
  use a maximum confidence value of each of the multiple attribute detectors to generate a feature vector of each of the one or more individuals;
  determine a weight associated with each of the multiple attribute detectors, wherein said weight corresponds to a reliability measure of the corresponding attribute detector relative to the remaining attribute detectors in the set of multiple attribute detectors;
  calculate a distance between each vector using a weighted vector distance between each vector based on the determined weight associated with each of the multiple attribute detectors; and
  compare the distance to a threshold to determine if the individual tracked in one of the two or more cameras is the same individual as the individual tracked in one or more other cameras of the two or more cameras.

21. The system of claim 20, wherein the at least one processor coupled to the memory is further operative to assign a unique tracking identifier for each trajectory of an individual locally tracked in each of the two or more cameras to facilitate tracking in a global coordinate system.

22. The system of claim 20, wherein the at least one processor coupled to the memory is operative to use the set of multiple attribute detectors to match an individual tracked in one of the two or more cameras with an individual tracked in one or more other cameras of the two or more cameras is further operative to use at least one of a geometric configuration of the two or more cameras, time information, and a set of individual attributes.

23. The system of claim 20, wherein the at least one processor coupled to the memory is further operative to:
  obtain a feature vector for the individual when the individual moves within the field of view of a second camera; and
  determine an amount of time taken by the individual to leave a view of the first camera and appear within a view of the second camera to determine if the amount of time is consistent with an established range of time.

* * * * *